July 4, 1961 H. B. SEDGFIELD ET AL 2,991,028
CONTROL SYSTEMS FOR AIRCRAFT
Filed March 18, 1955 4 Sheets-Sheet 1

INVENTORS
H. B. SEDGFIELD
W. R. BOHNEL
A. P. GLENNY AND
F. A. SUMMERLIN
BY Herbert H. Thompson
ATTORNEY July 4, 1961     H. B. SEDGFIELD ET AL     2,991,028
CONTROL SYSTEMS FOR AIRCRAFT Filed March 18, 1955                      4 Sheets-Sheet 2

INVENTORS
H.B. SEDGFIELD
W.R. BOHNEL
A.P. GLENNY AND
F.A. SUMMERLIN
BY Herbert H. Thompson
ATTORNEY

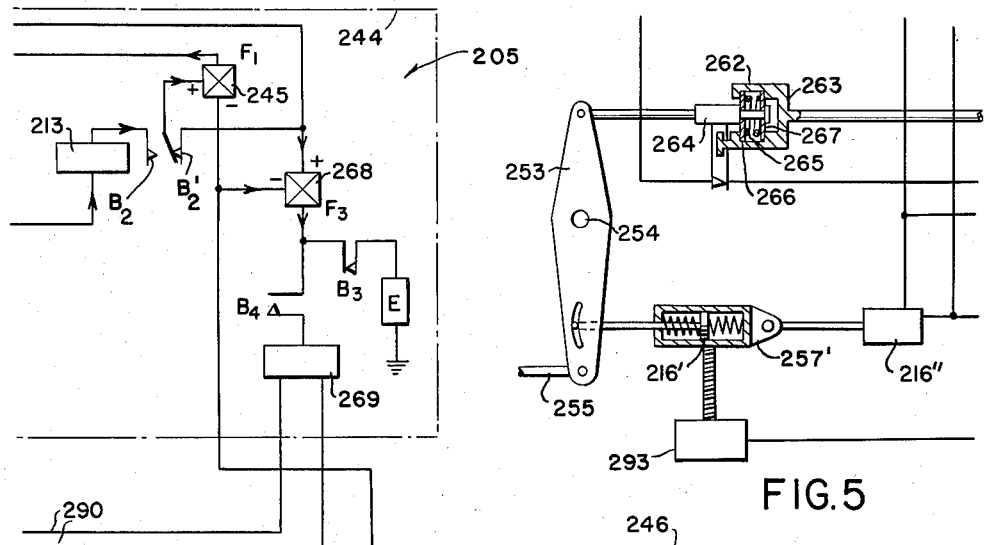
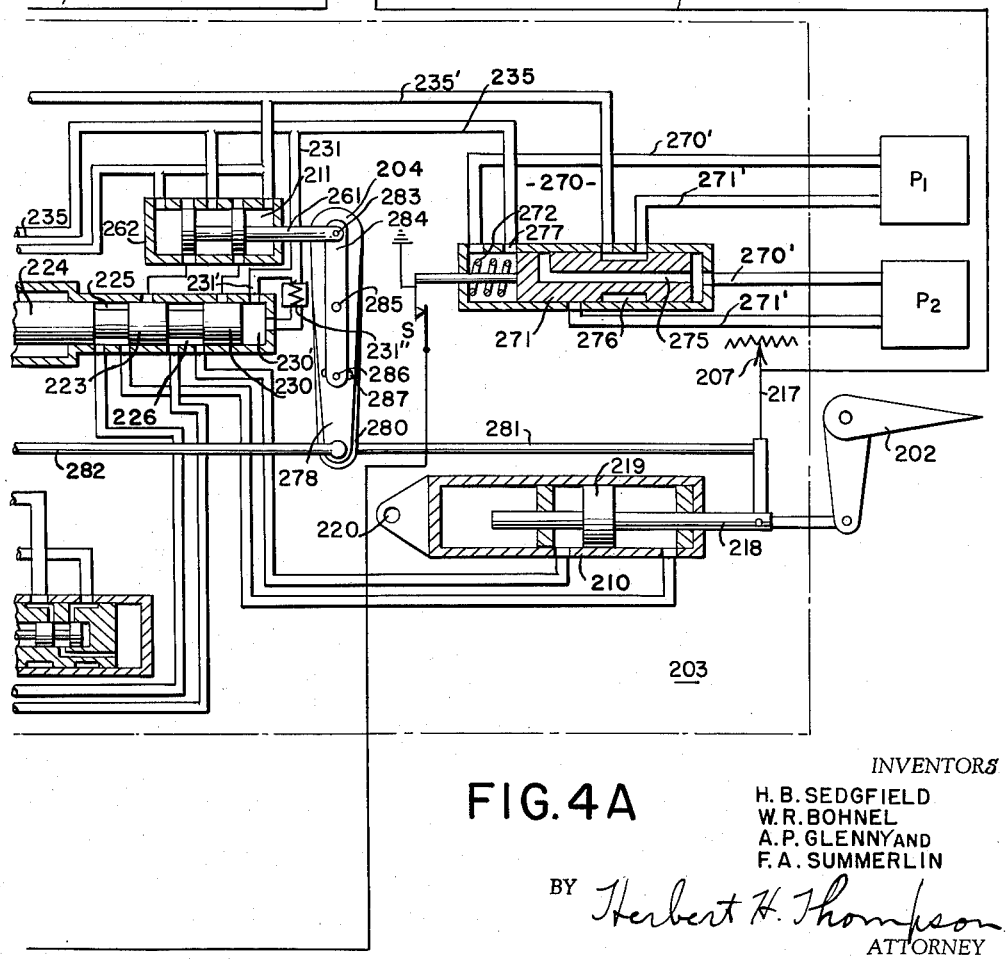
FIG.5
FIG.4A
INVENTORS
H. B. SEDGFIELD
W. R. BOHNEL
A. P. GLENNY AND
F. A. SUMMERLIN
BY Herbert H. Thompson
ATTORNEY United States Patent Office 2,991,028
Patented July 4, 1961

2,991,028
CONTROL SYSTEMS FOR AIRCRAFT
Hugh Brougham Sedgfield, Hampton, William Richard Bohnel, Windsor, Arthur Philip Glenny, Hanworth, and Frederick Arthur Summerlin, Isleworth, England, assignors to The Sperry Gyroscope Company Limited, Brentford, England, a British company
Filed Mar. 18, 1955, Ser. No. 495,143
Claims priority, application Great Britain Feb. 22, 1955
6 Claims. (Cl. 244—76)

This invention relates to control systems in general and, more particularly to control systems for aircraft.

Until quite recently aircraft designers have aimed at designing aircraft so that their main control surfaces could be controlled by un-aided manual control, or by manual control through servo tabs or the like which in effect provide aerodynamic servo aid. More recently power-aided manual control has come into use especially for large aircraft, according to which manual control is applied to control powered apparatus such as hydraulic or electric servo-motors, which apply the forces to deflect the control surfaces.

When automatic pilots have been provided in such power-controlled aircraft the practice has been, broadly speaking, to arrange for the automatic pilot to perform the task normally carried out by the pilot. The automatic pilot provided for use in such aircraft has generally been of a kind suitable for actuating the control surfaces of smaller aircraft, and it has been connected in the large aircraft so that its servo-motors actuate the mechanical linkages connected to the manual controller, so that the servo-motors control the control means for the actuators that displace the control surfaces of the aircraft in the same manner as a pilot does when he moves his manual controllers (control column or pedals). Generally speaking, this has not proved satisfactory, because the main hydraulic actuator and its control arrangements, and the linkages, are not adapted for the fast-acting accurate control required for use in an automatic pilot. In particular, it is a universal requirement in aircraft that there should be a direct mechanical linkage between the output of the actuator and the manual controller with only a very small possible relative displacement between them, this relative displacement being used in powered-control systems to open a valve or otherwise control the operation of the servo-motor. In this way the pilot can obtain directly, from the manner in which his manual controller operates, information on whether the actuator is moving according to instructions imparted either manually or automatically.

The present invention provides solutions to problems that arise in providing an integrated or combined manual and automatic control system for aircraft in which the error signals used for automatically controlling the aircraft are used to operate the same control valve for the servo motor that actuates the control surface as is operated by the manual controller.

According to one of its aspects the present invention provides an improvement in a combined manual and automatic control system for aircraft applicable whether this is of the kind that is an integrated system or not. This aspect of the invention provides a combined manual and automatic control system for aircraft in which the automatic control changes over to manual control if the pilot of the aircraft attempts to exercise manual control by attempting to give to the control surface a movement markedly different from the movement that is being imparted by the automatic pilot.

More specifically, according to this aspect of the invention there is provided a combined manual and automatic control system for aircraft comprising a monitoring control unit adapted to provide an error signal in dependence on the output(s) of one or more detecting instruments responsive to measures of departures of characteristics of the flight of the aircraft from predetermined values, or responsive to measures of departures of such characteristics from predetermined values, in such a way that the error signal is a measure of the departure of the aircraft from a predetermined condition of flight defined in terms of one or more such measures, said monitoring control unit being adapted to control the operation of a servo-motor connected to, or intended for connection to, a control surface of the craft in such a manner that displacement of the output member of the servo motor produces deflection of the control surface and consequent turning of the aircraft about one of its axes, a safety device through which the control surface, or the output member of the servo motor, is, or is intended to be, mechanically connected to a manual controller (for example, the pilot's control column, or foot pedal or an element adapted to be controlled thereby), which is arranged for manual operation by the pilot of the aircraft to enable manual control of the control surface to be effected, wherein the safety device includes a yieldable coupling constructed and arranged so as normally to transmit substantially without yielding, whatever forces are required to transmit displacements to the manual controller corresponding to those of the control surface (except possibly for a small amount of lost motion) but so as to yield for exceptional forces applied to the manual controller, for example, if sufficient manual force is applied to it by the pilot (for example, a force to oppose the movement imparted to the manual controller by the control surface), and wherein switch means are provided arranged to be actuated on yield of the yieldable coupling through more than a predetermined amount and adapted to render the monitoring control unit ineffective, and the manual controller effective, to exercise control of the servo motor.

According to a second aspect of the invention there is provided an electro-hydraulic control system capable of exercising control of a hydraulic servo-motor in either of two modes of operation, one of which effects control electro-hydraulically from an electrical control signal and the other of which effects control mechanically-hydraulically from a manual controller comprising: electrical differential means adapted to provide an electrical control quantity under the differential control of two electrical-signal-producing devices, one providing an order signal defining motion to be imparted to a load member, such as a control surface of an aircraft, by means of a hydraulic servo-motor and the other providing a repeat-back signal in dependence on motion of the output member of the servo-motor; an electrical control device having connections for receiving the electrical control quantity; a mechanical differential device adapted to be connected between the manual controller and the output member of the servo-motor and having a differential output member adapted to be displaced in accordance with the difference between displacement of the manual controller and the output member of the servo-motor; the said control device and the said differential output member each being adapted to control valve means for the servo-motor suitable for variably controlling the delivery of pressure fluid from a pressure source to the servo motor to cause movement of the output member of the servo-motor in one direction or the reverse; and control-transfer means adapted selectively to render either the differential output device or the differential electrical means effective and the other ineffective to control operation of the servo-motor.

According to a third aspect of the invention there is provided a control system for aircraft for controlling the operation of a servo-motor adapted to actuate a control surface of the aircraft comprising a main controller for the servo-motor adapted to control the direction in which the servo-motor moves, the control being exercised in accordance with a resultant input signal to the controller; means for realizing this resultant input signal as the algebraic sum of three components, one component being dependent on operation of the manual controller, a second component, which is a repeat-back or negative feed-back component, dependent on operation of the servo-motor in such a way that in the absence of the third component the servo-motor is controlled to become displaced by an amount proportional to the displacement of the manual controller, and a third component provided automatically by means, hereinafter referred to as damping means, responsive to deviations of the craft from its average or maintained heading or attitude, this third component being such as to cause the servo-motor to deflect the control surface to correct short term disturbances or oscillations of the aircraft of low amplitude, or such as to reduce them strongly in amplitude, even if no correcting action is applied to the manual controller by the pilot of the aircraft, and comprising also a mechanical linkage interconnecting the manual controller and the output member of the servo-motor that permits limited relative displacement, or "lost-motion," between the two of a magnitude exceeding the oscillating movement of the servo-motor produced by the damping means in the process of correcting or reducing short period natural oscillations of the aircraft, whereby the component of the motion of the servo-motor that is due to the component control quantity provided by the damping means is not transmitted back to the manual controller to be felt by the pilot.

According to a fourth aspect of the invention there is provided a servo-motor control system for causing a servo-motor to actuate a movable load member in dependence on an "error" signal that is a measure of the difference between a variable input or order signal and an output or repeat-back or performance signal produced in dependence on the operation of the servo-motor or on displacement of a member adapted to be actuated by the servo-motor, wherein there is provided a warning device which is adapted to be actuated by means responsive to the occurrence of an error signal of a magnitude greater than a predetermined magnitude.

According to a fifth aspect of the invention there is provided a servo-motor control system for causing a servo-motor to actuate a movable load member which governs the value of a variable in dependence on an error signal that is a measure of the difference between a variable input or order signal and defining a desired displacement that is to be imparted to the load member and an output or repeat-back or performance signal that is a measure of the displacement imparted to the load member wherein there is provided a warning device adapted to be actuated on the occurrence of an error in response of the servo-motor to the input or order signal that exceeds a predetermined amount.

According to a sixth aspect of the invention there is provided a control system for aircraft for controlling through two alternative channels the displacement of a control surface to correspond to a control signal, which is produced, or a component of which is produced in dependence on displacement of a manual controller comprising a first channel through which a servo-motor for actuating the control surface is controlled in dependence on a primary electrical error signal produced differentially independence on displacement of the manual controller and on an output electrical signal produced on displacement of the control surface or on displacement of an output member actuated by or adapted to be actuated on actuation of the control surface, and a second channel through which a servo-motor actuating the control surface is controlled by a mechanical differential linkage between the manual controller and the control surface or output member actuated by or adapted to be actuated on actuation of the control surface, and means for selecting the channel through which the control surface is to be controlled.

Embodiments of the invention will now be described by way of example only with reference to the accompanying drawings in which:

FIGURES 1 and 1A constitute a diagrammatic illustration of a combined or integrated manual and automatic control system for controlling the motion of an aircraft about one of its axes.

FIGURES 4 and 4A illustrate another embodiment of the invention.

FIGURE 5 illustrates a modification of FIGURE 4.

Figures 1, 1B:
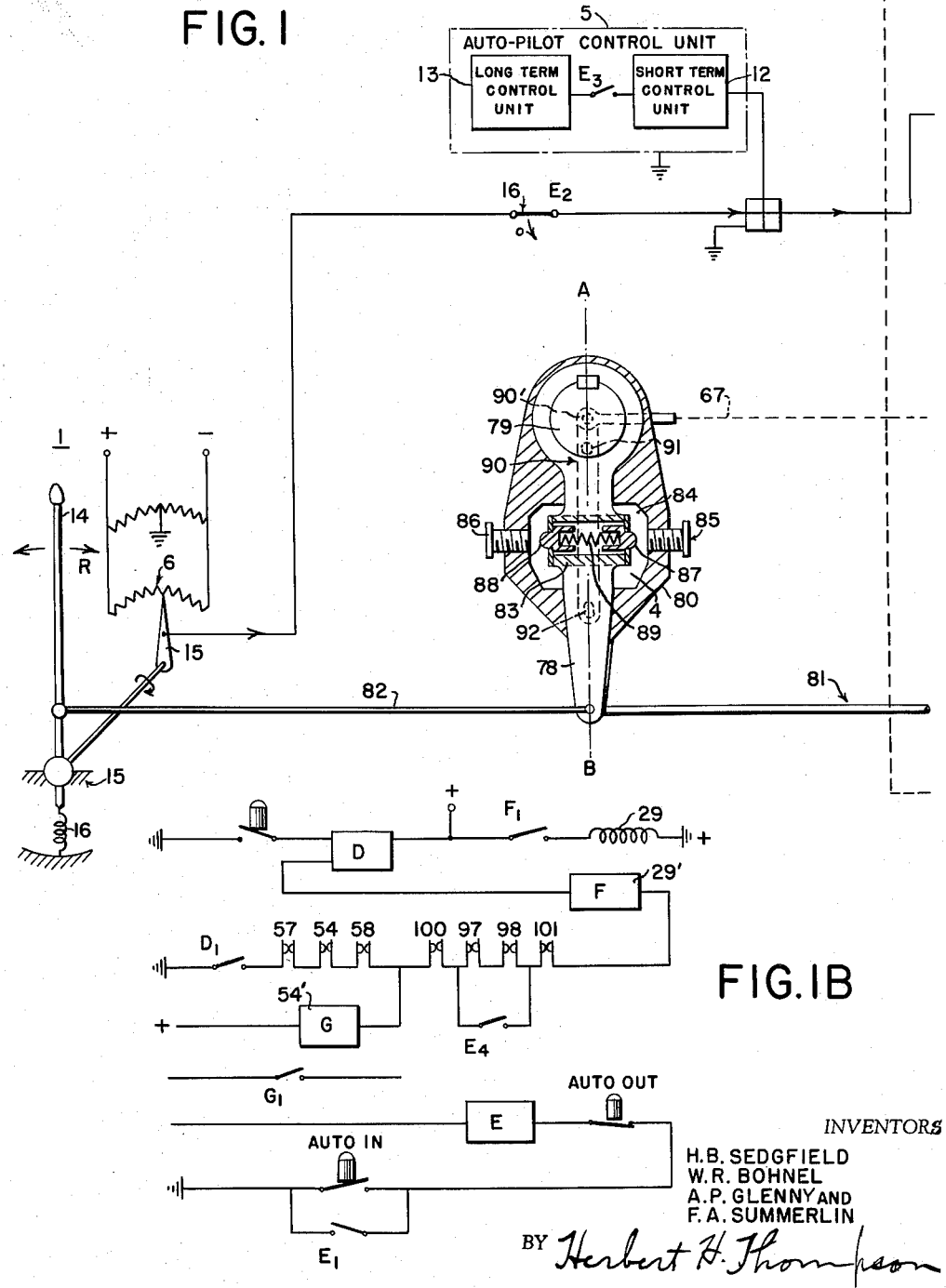
FIGURE 1B is an elementary circuit diagram.
Figure 1A:
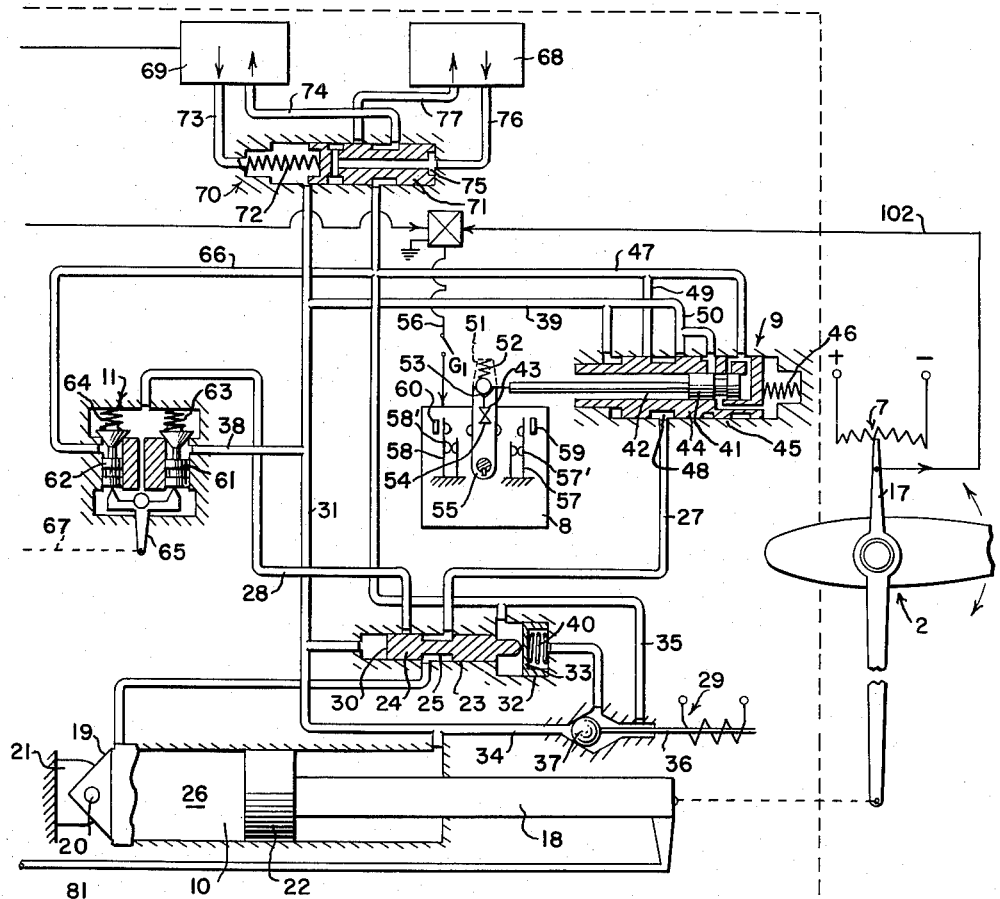
Figure 2:
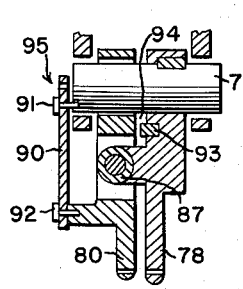
FIGURE 2 is a section through AB of the mechanical differential device 4 in FIGURE 1.

Referring to the drawings, FIGURE 1 illustrates a control system for controlling motion of an aircraft in which it is mounted about the aircraft's pitch axis. It will be appreciated, however, that the control system illustrated is representative of a control system that may be employed for exercising control about any one of the aircraft's pitch, roll, and azimuth axes.

The apparatus comprises essentially a pilot's manual controller 1, an elevator actuator 2, a hydraulic servo-amplifier 3, a mechanical differential device 4, and the auto pilot or monitoring control unit 5 which in the present embodiment comprises a long-term control unit 13 and a short-term damping control unit 12. Before describing details of these various components it may be stated that the apparatus is capable of both manual and automatic modes of operation. In manual operation the elevator-actuating device 2 may be controlled from the control column 1 through two separate control channels, a primary control channel for normal operation and a secondary control channel for operation in case of emergency. During normal manual operation the elevator-actuating device 2 is positioned under the control of differential electrical means comprising potentiometers 6 and 7, whose differential output is applied to an electrical transducer 8 which controls the operation of a control valve 9 which, in turn, controls the supply of pressure fluid to actuate a two-to-one differential area hydraulic servo-motor 10.

During manual emergency control, deflection of the elevator-actuating mechanism 2 is produced by the supply of pressure fluid to actuate the two-to-one hydraulic servo-motor 10 under the control of the emergency or secondary control valve 11 which is itself controlled by differential movement of two parts (78, 80) of the mechanical differential device 4 under the control of the manual controller 1.

During normal manual control of the elevator-actuating mechanism 2, the short-term control unit will also be operative to provide a control signal which is additive to the demand control signal provided by the potentiometer 6 on movement of the control column 14, and by operation of the elevator-actuating device 2, serves to provide control over short term disturbances or oscillations of the aircraft. The arrangement, as will hereinafter be described, is such that actuation of the elevator-actuating device 2 due to the signal from the damping unit does not effect movement of the manual controller 1 through the link 81 from the servo piston rod 18 through the differential device 4 to the control column 14 unless the signal from the damping unit exceeds a predetermined magnitude.

In the automatic mode of operation, the signal from the long-term control unit 13 is added to the signal from the short-term control unit 12 and applied differentially with the signal from the potentiometer 7 controlled by the elevator-actuating device 2 to the electrical transducer 8. The transducer 8 controls operation of the control valve 9 to control the supply of pressure fluid to the hydraulic servo 10 and thereby actuation of the elevator-actuating device 2. During automatic control the movement of the elevator-actuating device is transmitted to the manual controller 1 by the linkage 81 from the servo piston rod 18 through the differential device 4 to the control column 14, when the last motion in the system has been taken up.

The elevator-actuating device 2 may be controlled directly from the manual controller through the link 82, differential device 4, link 81 by completely overriding the remainder of the control system in which case appropriate arrangements have to be made in the hydraulic circuits to permit movements of the actuating device unopposed by forces due to fluid pressure.

The system as described provides for automatic control or manual control of the aircraft about its pitch axis with the employment of a common servo system for actuating the elevator.

Details of the various components and their interrelation will now be described.

The monitoring or auto-pilot control unit 5 in general is adapted to provide error signals in dependence on the output of one or more detecting instruments responsive to measures of characteristics of the flight of the aircraft (such as measures of bank angle, pitch angle, heading in azimuth, airspeed angle of climb, attitude, rate-of-turn, and angular or linear departure from one or more surfaces defined in position by radio signals), or responsive to measures of departures of such characteristics from predetermined values, in such a way that the error signals are measures of departure of the aircraft from a predetermined condition of flight defined in terms of one or more such measures.

The short-term or damping unit 12 of the auto-pilot control unit 5 provides short-term correcting signals for correcting short-term disturbances and oscillations and may comprise, for example, a rate-of-turn in pitch gyroscope or a differentiating circuit to which a pitch-deviation signal is supplied. The long-term control unit 13 provides long-term signals measuring the departures of the mean values of the aircraft's flight characteristics, over a period long compared with the short period disturbances, from predetermined, computed, or set, desired values of these characteristics. In particular for pitch control the unit 5 provides a pitch error signal such as is obtained from a gyro-vertical of a standard automatic-pilot for application to control the aircraft in pitch. The signal may be modified in a well-known manner by other signals, such as an altitude-displacement signal or a glide-path displacement signal.

The manual controller 1 comprises the pilot's control column 14 which is pivotally mounted on the aircraft structure about an axis 15 and extends below this axis to be attached to the artificial feel and trim unit 16 by means of which the pilot may "feel" the amount of displacement of the elevator. If the elevator has to be persistently kept on, the aircraft is out of trim and may be corrected. The pilot's control column 14 is also mechanically connected to displace the wiper arm 15 of the potentiometer 6, which is electrically connected, through the switch 16, to the electrical transducer 8, to which is also differentially connected the potentiometer 7 whose wiper arm 17 is controlled by the elevator-actuating device 2. The elevator-actuating device 2 is mechanically connected to be displaced by the piston rod 18 of the two-to-one hydraulic servo-motor 10.

The two-to-one hydraulic servo-motor 10 is also of a conventional design and comprises the cylinder 19 which is pivotally connected about the axis 20 to the aircraft structure 21 and a piston 22. The unit area side of the piston 22 of the two-to-one servo-motor 10 is exposed continuously to the pressure supply, whilst the pressure on the double area side of the piston is controlled either by means of a control valve 9 or by means of the control valve 11, depending upon whether the servo-motor is under normal manual or automatic control, or under emergency control.

A change-over valve or control-transfer means 23 is provided for selectively rendering the control valve 9 or the control valve 11 operative to control operation of the servo-motor 10. The control transfer means is in essence a two-position valve which consists of a plunger 24 sliding within a bore. An annulus 25 in the plunger connects the controlled pressure chamber 26 of the hydraulic servo-motor 10 either to the primary control valve 9 through the conduit 27 or to the secondary or emergency control valve 11 through the conduit 28 in dependence on energisation or de-energisation of a winding of an electrical transducer which is in the form of a solenoid 29 which controls the position of the plunger 24. The face 30 of the plunger 24 is connected to the conduit 31 which is connected to a high-pressure supply. In an enlargement of the bore of the change-over valve there is provided a piston 32 having a surface 33 of larger area than the area of surface 30. The surface 33 is connected either to the high-pressure supply in a conduit 34 or to the pressure in the return line 35 according as the solenoid 29 is de-energised or energised.

Energisation or de-energisation of the solenoid 29 determines the position of a plunger 36 which in turn determines the position of a ball 37 of a valve in the conduit 34. When the solenoid 29 is de-energised, high-pressure fluid from conduit 34 moves the ball 37 to the right and thereby permits the high pressure in conduit 34 to be applied to the surface 33, thus urging the piston 32 to the left and moving the valve 24 to the left-hand end of its bore. In this position the annulus 25 connects the high pressure in the conduit 31 to the chamber 26 of the servo-motor 10 through the conduit 38, emergency control valve 11 and the conduit 28. When the solenoid 29 is energised, its plunger 36 forces the ball 37 to close the high-pressure supply in the conduit 34 so that both surfaces of the piston 32 are connected to the low-pressure supply in the conduit 35. The control-transfer valve 24 is thus forced toward the right-hand end of its bore as shown in the drawing by the high pressure on the surface 30. The annulus 25 then connects the high-pressure supply in the conduit 31 to the chamber 26 of the two-to-one hydraulic servo-motor 10 through the conduit 39, the primary control valve 9 and conduit 27.

Whenever both pressure supplies to the control-transfer valve are cut off, the plunger 24 of the valve is urged to the left-hand side by the spring 40, thus ensuring that the emergency control valve 11 is in control.

The primary control valve 9 comprises a main control valve 44 controlled by an internal pilot valve 41. The pilot valve 41 is mechanically connected by a rod 42 to a controlling member or armature 43 of the electrical transducer 8. The main control valve 44 of the primary control valve 9 forms an integral part of a two-to-one differential area piston slidably mounted in the housing 45. The unit-area side of the piston is continuously connected to the high pressure supply in the conduit 39 and the pressure on the double-area side is controlled by means of the pilot valve. The spring 46 acting on the double area side of the control valve urges the control valve towards the left hand abutment in the absence of hydraulic pressure. The pilot valve 41 enables the control valve to be moved in response to smaller forces applied to the armature 43 of the electrical transducer than would need to be applied if the armature were directly connected to the valve 44. The pilot valve 41 and the control valve 44 form a closed-loop position system. In other words movement of the pilot valve 41 to the left will produce movement of the control valve 44 to the left and will thereby result in the connection of the chamber 26 of the servo-motor 10 to the low pressure in the conduit 47 through the conduit 49, the annulus 48 of the valve 44, the conduit 27, and the annulus 25 of the change-over valve 23. The piston 22 of the servo-motor 10 will thus be moved to the left by the high pressure continuously present on the right hand side of the piston 22 thus resulting in actuation of the elevator-actuating device 2. Similarly, if the armature 43 of the transducer 8 is moved to the right, the pilot valve 41 will be moved to the right and also the control valve 44, thus connecting the chamber 26 of the servo-motor 10 to the high pressure in the conduit 31 through the conduits 39, 50, the annulus 48, the conduit 27, and the annulus 25, and thus resulting in actuation of the elevator.

The electrical transducer 8 is a single double-acting relay, that is a relay, such as that known as a Laws relay, having a polarised stator whose poles are so arranged and shaped in relation to the poles of a displaceable armature that the armature is magnetically biassed towards a fixed zero or central position from which, however, it is displaced in magnitude and sense according to the magnitude and sense of current applied to a control winding or windings. In the drawing the transducer 8 is shown diagrammatically to comprise the armature 43 in the form of a lever which is pivoted about the axis 55 and is linked to the rod 42 by means of an overload-release clutch 51 in the form of two miniature ball bearings 53' whose inner races are carried on a common shaft. The outer races normally rest in a V slot 53 on the end of the lever 43 whose axis is parallel to the axis of the shaft and whose central plane passes through the pivot axis 55 of lever 43, being held in this slot by a biassing spring 52 acting on the shaft. The shaft is connected or linked to the rod 42. A unit 54 for detecting pilot-valve stiction consists of a pair of normally closed contacts, one connected to the shaft of the miniature ball bearings and the other to the lever 43. The biassing spring 52 urging the miniature ball bearings into the V slot 53 on the lever exerts such a force that the ball races form a substantially rigid link between the lever and the rod 42 for all conditions of normal functioning. However, when the resistance to movement of the pilot valve 41 due to stiction exceeds a limit determined by the characteristics of spring 52 and the force applied to the lever 43 to move the valve 41 exceeds this value, the spring yields to permit the ball races to ride high in the V slot, thus breaking the electric contact across the unit 54. The breaking of the electrical contact across the unit 54 operates a fast-operating self-holding relay 54' which breaks contacts in the error-signal line 56. It will be appreciated that the contacts of the unit 54 are normally closed.

A unit for detecting stiction of the control valve 44 and excessive error signals is mounted on the electric transducer 8 and comprises a pair of normally closed spring-operated contact devices 57, 58. The contact device 57 has its contacts broken when the spring member 57' is moved to the right by deflection of the lever 43 through more than a predetermined amount which in the drawings is considerably exaggerated for clarity. Similarly, the contact of the unit 58 is broken when the spring member 58' is moved to the left on deflection of the lever 43 to the left through more than a predetermined amount. In operation, if an error signal is applied to the transducer armature 43, the latter operates to move the pilot valve, but if the main control valve 44 nevertheless sticks, the pilot valve will continue its movement to the right or left, as the case may be, under the control of the lever 43 and break one or other of the contacts of the units 57, 58.

Stops 59, 60 are provided on the electrical transducer unit to limit the maximum displacement of the lever 43.

The secondary or emergency control valve 11 comprises two valves 61, 62, of the poppet type which are hydraulically balanced and biassed on to their respective seats by springs 63, 64. The poppet valves 61, 62 are actuated by a rocker arm 65 which lifts one or the other off its seat according to the sense of rotation of the rocker arm. One valve 61 operates on the high-pressure supply from the conduit 38 and the other valve 62 operates on the low-pressure side or return line 66. The rocker arm 65 is controlled by a link 67 connected to a lever 90 controlled by the mechanical differential device 4 to be hereinafter described in greater detail.

The hydraulic amplifier unit 3 comprises an inlet valve 70 of the plunger type which selectively connects two alternative sources of pressure supply 68, 69 into the system. The inlet valve 70 comprises a plunger 71 which is urged to the right-hand position as shown in FIG. 1 by means of a biassing spring 72. The two separate pressure sources 68, 69 each consists of a high-pressure line, 76, 73 and a return line 77, 74 connected to the inlet valve. Normally, the valve permits the source 69 to be connected in the system through the high-pressure conduit 73 and the return conduit 74, the other high-pressure source 68 being disconnected. However, if the pressure source 69 fails, the plunger 71 will be displaced towards its left-hand abutment by the unbalanced hydraulic pressure on the plunger acting against the spring 72 due to high pressure from the source 68 being applied to the face 75 of the plunger 71. When the plunger is thus moved against its left-hand abutment, the source 68 is connected to the system through the high-pressure supply conduit 76 and the return conduit 77.

Referring to FIGURES, 1, 2 and 3, the mechanical differential device 4 comprises an input lever 78, mechanically connected to the pilot's controller 14 by a link 82. The input lever 78 is keyed to a shaft 79 carried in bearings located in the aircraft structure. On the shaft 79 there is mounted an output lever 80 with freedom of angular movement about the axis of the shaft 79. The output lever 80 is mechanically linked by the link 81 to the piston rod 18 of the two-to-one servo-motor 10, which when actuated produces movement of lever 80 about the axis of shaft 79 by an amount corresponding to the movement of the elevator-actuating device 2. The input lever 78 carries a unit 83 which co-operates with a recess 84 in the lever 80 to serve as a lost-motion arrangement between the two levers. The amount of lost motion may be adjusted by the adjustable stops 85, 86. The unit 83 on the lever 78 carries spring-biassed plungers 87, 88, the plungers having a common biassing spring 89. There is also provided on the unit 4 a lever 90 that controls the rocker arm 65 through the link 67. The lever 90 is pivoted on the shaft 79 by means of the pivot 91. The upper end of the lever 90 is connected to the link 67 at the connection point 90' normally on the axis of the shaft 79 and the lower end is connected to the input lever 80 by means of a vertical slot and pin connection 92. Thus movement of the input lever 78 to the left or right produces a corresponding movement of the link 67 to the left or right. As has been previously stated this link operates the rocker arm 65 and the whole arrangement provides means for controlling the elevator-actuating device 2 through the valve 11 during an emergency.

The function of the spring-biassed plungers will be described hereinafter.

Figure 3:
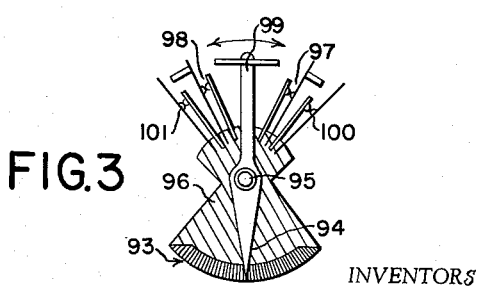
FIGURE 3 is an illustration of a mechanism controlled by differential movement of two members of the mechanical differential device in FIGURE 1; this mechanism is not shown in FIGURE 1 but is shown in part in FIGURE 2.

The unit 4 also comprises a unit shown in greater detail in FIGURE 3. This unit comprises a pick-off device in the form of a potentiometer 93 and a wiper arm 94 so mounted on the output lever 80 and the input lever 78, respectively, that relative rotation of the two levers produces relative angular rotation of the wiper arm and potentiometer winding about the axis 95 coincident with the axis of the shaft 79. Mounted on the member 96 carrying the potentiometer winding 93 are a pair of limit switches 97, 98 positioned so as to be broken by an extension 99 of the wiper arm 94 on relative angular displacement of more than a predetermined amount between the wiper arm and the potentiometer winding and therefore between the levers 78 and 80. One or other of these switches is broken if, during manual control, the signal from the short-term control unit 12 is greater in one sense or another than a predetermined magnitude. Thus, if the signal from the short-term control unit 12 is of such a magnitude as to cause the elevator-actuating device 2 to be moved by more than a predetermined amount, the linkage 81 will move the output lever 80 by an amount that will cause one or other of the contacts 97, 98 to be broken, to cause de-energisation of the solenoid 29 and render emergency control operative.

Another pair of contacts 100, 101 mounted on the member 96 are normally made and are broken on relative angular movement of the levers 78, 80 through a still greater amount than is required to break the contacts 97, 98. These switches also operate to de-energise the solenoid 29 as will hereinafter be noted.

The output of the potentiometer pick-off 93 provides information to the pilot during automatic control to enable him to trim the aircraft since if the aircraft is out of trim during automatic control the elevator will be permanently displaced through some small angle to "crab" the aircraft, thus resulting in a deflection of the output lever 80 relative to the input lever 78, this being permitted by the lost motion device. The relative displacement of the two levers produces a corresponding relative displacement of the wiper arm 94 and potentiometer winding 93, the latter providing a signal dependent on the amount of out of trim.

The operation of the control system will now be described in three separate stages, namely, emergency control, manual control, and automatic control, the emergency control operation being described first since it is referred to in both of the other forms of control.

EMERGENCY CONTROL

The electrical part of the system has become inoperative so that the solenoid 29 is de-energised and the plunger 24 of the change-over valve 23 has been urged against its left-hand abutment, thus connecting the actuating two-to-one servo-motor 10 to the pressure source 69 through the emergency or secondary control valve 11.

Movement of the pilot's control column 14 results in rotation of the input lever 78 and therewith the shaft 79 relative to the stationary output lever 80. The pivot 91 rotating with the shaft 79 causes movement of the differential lever 90 about the pivot 92 to the right or left as shown in FIGURE 1 in dependence on whether the pivot 91 moves to the right or left. Thus the link 67 is also correspondingly moved to the right or left to cause actuation of the rocker arm 65.

Assuming that the pilot's control column 14 is moved towards the right hand side from its neutral position as shown in FIGURE 1, the input lever 78 correspondingly rotates anti-clockwise and the link 67 is displaced to the right in correspondence with the control column. As a result, the rocker arm 65 rotates anti-clockwise about its axis lifting the high-pressure poppet valve 61 off its seat against the action of the spring 63. Through the orifice thus formed, high-pressure fluid from the source 69 is metered into the controlled pressure chamber 26 of the two-to-one servo-motor 10, thus causing the piston 22 to move to the right, again in correspondence with the pilot's control column 14. Motion of the piston 22 produces movement of the elevator-actuating member 2 and thus of the elevator. Motion of the piston 22 to the right also produces a corresponding anti-clockwise rotation of the output lever 80 of the unit 4 through the linkage 81. The output lever 80 in its anti-clockwise motion carries with it the pivot 92, and if the control column and therefore the input lever 78 are now stationary, the differential lever 90 is moved by movement of the output lever 80 until it returns to its normal position relative to the two levers. To reach this position, the linkage 67 will have been moved to the left until its point of attachment to the lever 90 is again coincident with the axis of that shaft 79.

Movement of the link 67 in this manner causes rotation of the rocker arm 65 in the clockwise direction to its normal position in which both the poppet valves 61, 62 are in their closed positions. This results in shutting off of the pressure supply to the cylinder end 26 and prevents the flow of pressure fluid in the system. Consequently the motion of the piston 22 is stopped and a new state of equilibrium is established in which the elevator is deflected by an amount corresponding to the deflection of the control column 14.

Similar considerations apply to deflection of the control column 14 to the left.

NORMAL MANUAL CONTROL

The electrical control system is switched on and the switch 16 is made. The long-term control unit 13 is switched off and the short-term damping unit 12 is switched on. The solenoid 29 is energised so that the plunger 24 of the change-over valve 23 is in its right hand position as shown in FIGURE 1. Thus, the two-to-one servo-motor 10 is connected to the pressure source 69 through the primary control valve 9.

With this state of affairs, movement of the control column 14 generates an electrical signal across the input potentiometer 6 which is added to the signal derived from the stabilising unit 12 to constitute a total demand signal which is applied through the channel 56 to produce angular movement of the armature 43 of the transducer 8 about its axis 55 by an amount proportional to the signal. This produces movement of the pilot valve 41 and a corresponding movement of the main valve 44, thus connecting the two-to-one servo-motor 10 to the high-pressure source 69. As a result, the piston 22 is moved to the right or left as shown in the drawing to actuate the elevator-actuating mechanism 2 and thus position the rudder and the wiper arm 17 thereby producing an output or repeat-back signal from the potentiometer 7. This signal is fed along the channels 102 and 56 in opposition to the demand signal formed by the sum of the signals from the potentiometer 6 and the damping unit 12. As the repeat-back signal increases, the member 43 is rotated about its axis in a direction opposed to its previous direction and when the repeat back signal is equal to the combined input signal the member 43 will again be in its central position and the control valve will also be in its normal position in which the pressure source 69 is shut off from the two-to-one servo 10 and the flow of oil is arrested. A condition of equilibrium then exists in which the elevator has been deflected by an amount corresponding to the signal due to deflection of the control column and the superimposed damping signal.

The electrical error signal appearing in the channel 56 is amplified before application to control the position of the member 43.

Simultaneously with the above referred to functioning of the apparatus, movement of the pilot's control column 14 actuates the input lever 78 of the mechanical differential 4 and produces movement of the lever 90 and thus also of the rocker arm 65 of the emergency valve 11 in a manner similar to that described in connection with the emergency control. However, actuation of the emergency valve 11 has no effect on the two-to-one servo-motor 10 since the plunger 24 is now in its right hand position and therefore blocks the flow of oil through the valve 11. The two-to-one servo-motor 10 can thus only respond to the movements of the primary control valve 9.

Movement of the piston 22 also produces through the link 81 movement of the output lever 80 by an amount corresponding to the amount of movement of the lever 78 that was produced by the control column 14, but with some delay, the relative motion between the two levers 78 and 80 being permitted by the lost motion device 83, 84, 85.

In the normal manual operation, as has been stated, a damping signal from the damping unit 12 is superimposed upon the pilot's demand signal so that the movement of the elevator is proportional to the algebraic sum of these two signals. The damping unit 12 is responsive to short-term or transient disturbances or oscillations of low amplitude in the direction of the aircraft, for example, rapid phugoid or "snaking" oscillations, and operates automatically to check, minimise, or damp, such transient disturbances or oscillations without affecting the control action exercised by the pilot of the aircraft by means of the manual controller, so that the pilot is relieved of the task of continuously correcting low amplitude rapidly-changing changes in the heading or attitude of the aircraft, and is required to use his manual controls solely for manoeuvring the aircraft, or for correcting the less frequent larger and slower disturbances of the aircraft due to external conditions such as gusts, and "air pockets," and the like. It is thus a feature of the system described that the movement of the elevator in response to the stabilising signal does not appear on the pilot's control column this being achieved by suitable adjustment of the lost motion between the levers 78 and 80 by means of the adjustable stops 86, 87. Thus, if the magnitude of the damping signal is limited to a selected maximum value, say, that corresponding to plus or minus 2° of elevator movement, the clearance between spring-biassed plungers 87, 88 and the two adjustable stops 85, 86 is correspondingly adjusted such that the plungers 87, 88 will not, for these movements, come into contact with the stops 85, 86 and movement of the output lever 80 will therefore not produce a movement of the input lever 78. Accordingly movement of the elevator produced by the stabilising signal acting alone will not reflect itself on the control column 14.

The stabilisign limit switches 97, 98 (FIGURE 3) are set at angular distances to be broken when the selected maximum value for the damping signal is exceeded while the lost motion permitted between the two levers 78, 80 is slightly in excess of this value to permit the actuation of the switches. Signals from the damping unit 12 in excess of the selected maximum value will result in the opening of one or other of the contacts 97, 98 and thus switch off the electrical control network. The solenoid 29 will thus become de-energised and will cause re-positioning of the plunger 24 of the change-over valve 23 so as to connect the system for emergency control through the emergency valve 11.

A feature of the system illustrated and described is that it is designed to cater for a number of emergencies that may occur during operation. These emergencies and the manner in which they are catered for are as follows:

Loss of one hydraulic supply

This is catered for by the inlet valve 70 which automatically connects the alternative source of pressure supply 68 to the hydraulic amplifier stage if the pressure supply from the source 69 fails. The control in this case, unless some other emergency arises, will still be through the primary control valve 9 and not through the emergency control valve 11.

Loss of electrical supply

If the electrical supply fails, the solenoid 29 which is normally energised will be de-energised, thus causing repositioning of plunger 24 from its normal position as shown in FIGURE 1 to its left hand position in which the emergency valve 11 is in control of the system and the control valve 9 is rendered ineffective.

Excessive signal in the electrical circuit

Excessive electrical demand signal will be detected by the overload-release arrangement between the armature 43 of the electrical transducer 8 and the link 51 to the pilot valve 41. The higher rate of response of the transducer due to the excessive signal will result in breaking of the switch 54 and thus cause the operation of a very fast operating holding relay 54' in the electrical control circuit which will ensure that the error signal path to the electrical transducer 8 is broken instantaneously. The armature 43 of the electrical transducer 8 is then biassed to its neutral position. The solenoid 29 is also simultaneously de-energised by a fast-acting relay 29' connected in its circuit thus causing repositioning of the plunger 24 of the change-over valve 23, thus again rendering the emergency control valve 11 effective.

Sticking pilot valve

Should the pilot valve 41 of the control valve 9 tend to stick due, for example, to silting, the input signal to the electrical transducer 8 will build up due to the lack of, or insufficient magnitude of, a repeat back signal from the potentiometer 7 until the torque applied to the armature 43 overcomes the preset load of the spring 52 and thus allows the ball bearings to ride high on the V slot 53. The switch 54 is then broken and the fast-operating holding relays 54' and 29' operate to break the electrical control circuits as before. The solenoid 29 is thus de-energised and the plunger 24 of the change-over valve 23 moves to the left to connect the emergency valve 11 into control of the system.

Sticking control valve

Control valve 44 of the primary control valve 9 may stick either in its neutral position or at any intermediate position along its stroke.

If it sticks in its neutral position, the error signal applied to the electrical transducer 8 will build up and displace the armature 43 until one or other of the contacts 57', 58' is broken. This results in the fast-operating relays 54' and 29' functioning to break the electrical control circuits thereby de-energising the solenoid 29 and as before connecting the emergency control valve 11 into the system.

If the control valve 44 sticks at any position except neutral, the error signal supplied to the electrical transducer 8 will build up due to continued deflection of the elevator and will ultimately cause displacement of the armature 43 to break one or other of the contacts 57', 58' thus resulting in a transfer of control to the emergency control valve 11 as before. It will be appreciated that the pilot may at will produce an excessive signal manually by deflection of his control column.

Excessive signal from the damping unit

If a signal is obtained from the damping unit 12 which is greater than a preset value, one or other of the two contacts 97, 98 (FIGURE 3) is broken thus operating the fast-operating relays 54' and 29' to switch off the electrical control network. The solenoid 29 is de-energised and the emergency valve 11 is brought into control.

Sticking electrical transducer

A sticking electrical transducer cannot be detected by mechanical means and although electrical detecting means have not been shown it will be appreciated that such a unit can be provided. When the armature 43 of the transducer sticks in its neutral position no movement of the pilot valve 41 will take place and consequently no movement of the elevator will be produced. Continued movement of the pilot's control column 14 will eventually produce sufficient differential movement between the input and output levers 78, 80 of the unit 4 to result in the breaking of one or other of the contacts 97, 98 thereby breaking the electrical control circuit and bringing the emergency control valve into operation.

Should the armature 43 of the transducer 8 stick at some position other than nuetral, the two-to-one servo-motor 10 will operate continuously to move the elevator and therewith the output lever 80 of the unit 4 with the result that, even if the pilot holds the control column 14 stationary, one or other of the contacts 97, 98 must eventually be broken to break the electrical control circuits and to bring the emergency control valve 11 into operation. Out-of-trim in normal manual control may be indicated by an indicator controlled by the output of potentiometer winding 6.

AUTOMATIC CONTROL

During automatic control the electrical control circuit is switched on, but the switch 16 is switched off, thus disconnecting the input potentiometer 6. The outputs from the long-term and short-term units of automatic pilot control unit 5 are added and applied differentially with the output from the repeat back potentiometer 7 along the channel 56 to the electrical transducer 8. During automatic control the damping unit or short-term unit limit switches 97, 98 are switched out of the circuit. The error signal supplied along the channel 56, to the electrical transducer 8 serves through the valve 9 and two-to-one servo-motor 10 to position the elevator by an amount corresponding to the combined signal from the auto pilot control unit 13. The movement of the piston 22 of the two-to-one servo-motor 10 actuates through the linkage 81, the output lever 80 of the unit 4 and the output lever 80, after having traversed the lost motion permitted by the plungers 87, 88 and stops 85, 86 produces movement of the input lever 78 and thus a corresponding movement of the control column 14. Thus, if the signal from the auto pilot control unit is greater than a predetermined value. It will be seen that the control column follows the movements of the control surface but with a certain amount of lag.

The seven emergency cases referred to in connection with the normal manual control of the system are again catered for. The loss of one hydraulic supply failure results in a secondary supply being connected and the system still functions under automatic control. The other five cases will result in de-energising the solenoid 29 and revert the system to emergency manual control through the emergency valve 11.

A sticking transducer under automatic control may be dealt with as follows:

1(A). ARMATURE 43 OF TRANSDUCER STUCK IN NEUTRAL POSITION

By instinctive operation by the pilot in moving the control column 14 to override the pre-set load on the spring-biassed plungers 87, 88 produced by the resulting deflection of the input lever 78 of the unit 4, the output lever 80 being, at this time, held stationary by the inoperativeness of the two-to-one servo-motor 10 due to the lack of control from the electrical transducer 8. The resulting differential deflection of the levers 78 and 80 will eventually break one or other of the contacts 100, 101 connected in the electrical circuit that includes the solenoid 29 and thereby break the electrical circuit, denergise solenoid 29 and bring the emergency valve 11 into operation.

1(B). ARMATURE 43 STUCK IN A POSITION OTHER THAN NEUTRAL

The two-to-one servo-motor 10 will "run away" due to the persistent signal and accordingly produce differential deflection of the levers 78 and 80 if the control column is held, thus resulting in the overriding of the pre-set load in the spring loaded plungers 87, 88 and eventually to the breaking of one or other of the contacts 100, 101 to de-energise the electrical control circuit and thereby the solenoid 29 to bring into operation the emergency control valve 11.

2. BY THE PROVISION OF A SEPARATE SWITCH TO BE BROKEN BY THE PILOT TO DISCONNECT THE ELECTRICAL CONTROL UNITS

The pre-set load of the spring 89 of plungers 87, 88 must be such that it permits transmission between the input and output levers 78 and 80 under normal conditions of operation without deflection of the spring. The spring must only deflect due to loads in excess of the pre-set load such as may be applied by the pilot to the control column to counteract a "run away" servo-motor or as may be applied by an excessive acceleration of the servo piston when the control column is held.

The pilot valve 41 of the primary control valve 9 is caused to dither by means (not shown) in order to reduce the tendency of the valve to stick.

Heating or cooling arrangements for the apparatus may be provided if necessary.

Figure 4:
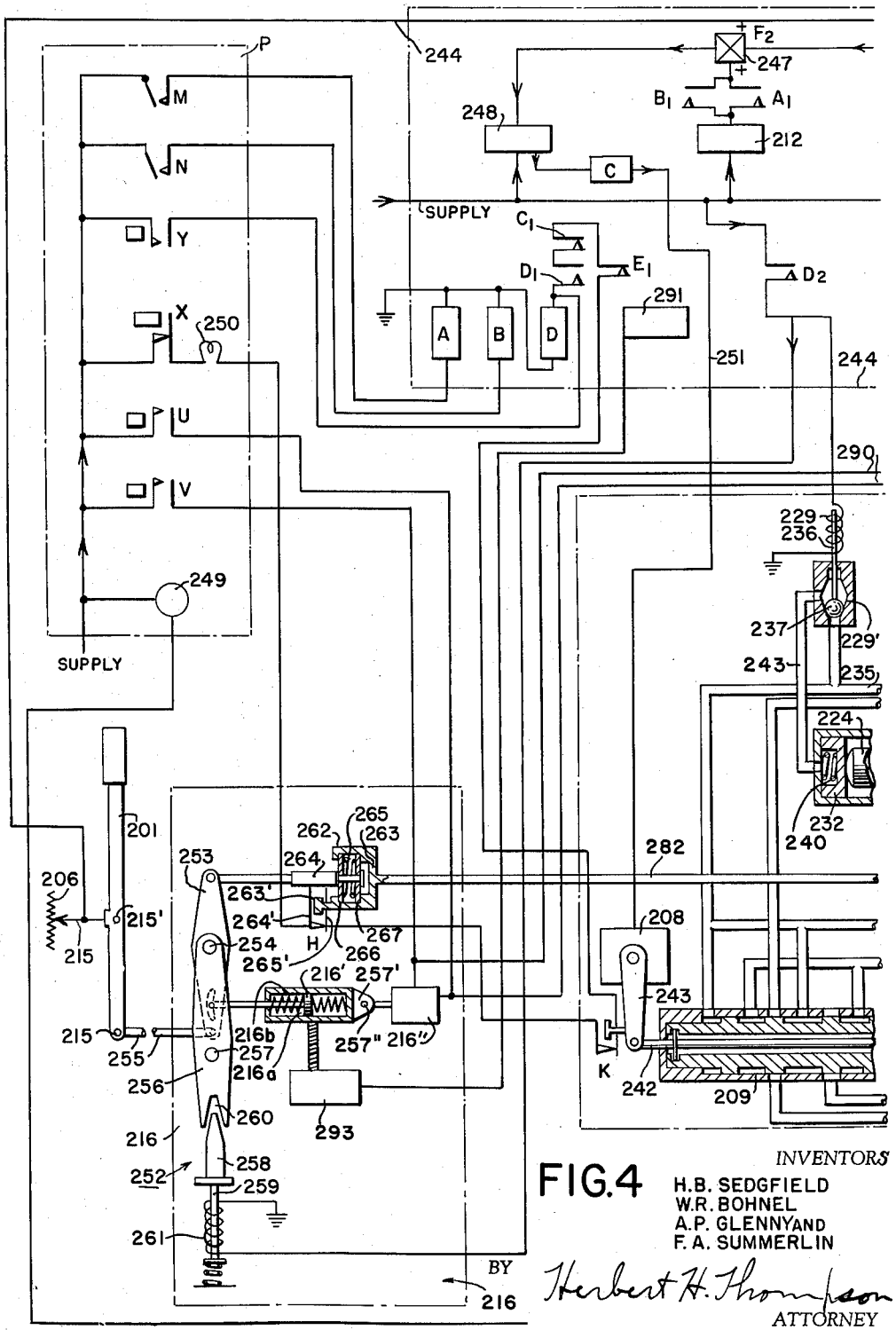

Another embodiment of the invention is illustrated in FIGS. 4 and 4A.

Referring to FIGURE 4 there is illustrated a control system for an aircraft for enabling the aircraft to be controlled about its pitch axis either manually with servo aid or automatically. It will be appreciated that the control system illustrated is representative of a control system that may be employed for exercising control of the aircraft about any one of its three axes.

The apparatus comprises a pilot's manual controller or control column 201 for controlling an elevator 202 to produce changes in pitch of the aircraft, an electro-hydraulic power unit 203, and an electrical control unit 205 which includes a short term automatic control unit 212 and a long term automatic control unit 213. The apparatus also includes a feel unit 216 and a pilot's control panel P. Before describing details of these various components it may be stated that the apparatus is capable of operation in different modes. The elevator 202 may be controlled manually from the control column 201 through two separate channels, a normal channel and an emergency channel. The elevator 202 may also be controlled automatically from an instrument or instruments forming part of electrical control unit 205, and possibly from other instruments (not shown) such as a radio receiver.

The apparatus provides for power actuation of the elevator 202 from the control column 201 and for this purpose differential electrical means are provided comprising potentiometer 206 actuated by the control column 201 and potentiometer 207 actuated by the servo motor 210 that moves the elevator 202. The differential output of the potentiometers 206 and 207 is applied to an electrical transducer 208 which controls the operation of a main control valve 209, which in turn controls the supply of pressure fluid to operate a hydraulic servo motor 210, the servo motor 210 serving to position the elevator 202. This comprises the main control channel for actuation of the elevator 202 by the control column 201.

The other controlc hannel by which the elevator 202 may be controlled by the control column 201, for example, during an emergency when faults have occurred in the system which render control through the main control channel impossible or dangerous, comprises an emergency control valve 211 which controls the supply of pressure fluid to actuate the servo motor 210 under the control of a mechanical differential device 204, the mechanical differential device consisting of two input members 278 and 280, capable of differential movement of limited amount, one under the control of the control column 201, and the other under the control of an output member 218 of servo motor 210, and an output member 284 connected to actuate the control valve 211.

During normal manual control of the elevator 202, that is, when the servo motor 210 is being controlled through the transducer 208 and the main control valve 209, the short-term automatic control unit 212 may also be rendered effective to provide a control signal which is added to the demand control signal provided by the potentiometer 206 on movement of the control column 201 and to the repeat-back signal provided by the potentiometer 207 on movement of the output member 218 of the servo motor 210. The short-term stabilizing unit 212 is responsive to short-term or transient distrubances or oscillations of low amplitude of the aircraft, such as rapid snaking oscillations and serves to control the elevator 202 so as to nullify the short-term disturbances or oscillations of the aircraft automatically, and, as will hereinafter be described in greater detail, the control is such that actuation of the elevator 202 due to the signal from the short-term unit 212 does not effect movement of the control column 201 through the linkages 281, 282 by which the elevator is mechanically connected to the control column 201.

When the apparatus is functioning as an automatic control system for controlling the aircraft's attitude about its pitch axis, a signal from the long term control unit 213 is combined with the signal from the potentiometer 207 and the signal from short-term stabilising unit 212, the resultant signal being applied to the transducer 208 which controls operation of the main control valve 209 to control the supply of pressure fluid to actuate the hydraulic servo motor 210. The signal generator 206 is disconnected. The elevator 202 is thus automatically controlled by the outputs of the short-term and long-term units 212 and 213. The system as briefly described above thus provides for automatic control or manual control of the aircraft about its pitch axis with the employment of a common servo system for actuating the elevator.

Details of the various components and their inter-relation will now be described. The control unit 205 is adapted to provide an error signal in dependence on the output of one or more detecting instruments responsive to measures of the characteristics of the flight of the aircraft, such as measures of bank-angle, pitch-angle, airspeed, heading-in-azimuth, angle-of-climb, attitude, rate-of-turn and angular or linear departure from one or more surfaces defined in position by radio signals, or responsive to measures of departure of such characteristics from predetermined values in such a way that the error signal is a measure of departure of the aircraft from a predetermined condition of flight defined in terms of one or more such measures.

The short-term unit 212 of the auto-pilot control unit 205 provides signals for correcting short-term disturbances and oscillations of the aircraft. The long-term control unit 213 provides long-term signals measuring the departure of the mean values of the aircraft's flight characteristics from a predetermined, computed or set desired value of these characteristics over a period long compared with the short period of the short term disturbances and oscillations.

The control column 201 is pivotally mounted on the aircraft's structure about an axis 215 and extends below this axis to be attached mechanically to an "artificial feel" generator 216' forming part of the feel unit 216. By means of the feel generator 216' the pilot experiences "artificial feel" corresponding to the extent of actuation of the elevator 202. The control column 201 is also mechanically connected to position the wiper arm 215 of the potentiometer 206 which is electrically connected by lead 244 to the electrical differential 245 to which is also connected, through lead 246, the potentiometer 207, the wiper arm 217 of which is positioned by the output member 218 of the hydraulic servo motor 210. The output of the electrical differential 245 is connected to the electrical differential 247 to which the output signal of the short-term unit 212 may also be connected as hereinafter described. The output of the long-term stabilising unit 213 may also be connected to the electrical differential 245 as hereinafter described. The output from the electrical differential 247 is applied to an amplifier 248 whose output is applied through relay C and lead 251 to energise the transducer 208. Thus, when the short-term and long-term units 212 and 213 are not effective in the system, that is, the system is on manual control through the main control channel, a signal generated in the potentiometer 206 on movement of the control column 201 energises the transducer 208 to produce movement of the main control valve 209 thereby producing flow of pressure fluid to the hydraulic servo motor 210 to actuate the elevator 202. Movement of the output member 218 of the servo motor 210 produces movement of the wiper arm 217 of the potentiometer 207 thereby generating an electrical signal which is fed in opposition to the electrical signal generated in the potentiometer 206 and acts to move the main control valve 209 to cut off the supply of pressure fluid to the servo motor 210. Thus the elevator 202 is displaced through an amount proportional to the deflection of the control column 201.

The hydraulic servo motor 210 is of conventional type and comprises the cylinder 219 pivotally connected about the axis 220 to the aircraft's structure and an output piston member 218. The output member 218 is positioned in dependence on whether pressure fluid is applied to the right-hand side or left-hand side of the piston, this being determined by the position of the main control valve 209 (or the emergency control valve 211 as will hereinafter be described).

A changeover valve or control transfer means 223 is provided for selectively rendering the control valve 209 or the control valve 211 operative to control operation of the servo motor 210. The changeover valve 223 is in essence a two-position valve consisting of a plunger 224 sliding within a bore. The plunger 224 in the position shown in the drawing serves to render the main control valve 209 effective to control the supply of pressure fluid to the servo motor 210 through annuli 225, 226. The plunger 224 is biassed to the left-hand position shown in the drawings by pressure fluid applied to the right-hand face 230 of the plunger 224 through the conduit 231, the plunger being held in this position against the operation of a biassing spring 240 located in a hollow piston 232 whose interior is connected through the conduit 234 to the low pressure side of the pressure supply. The interior of the hollow piston 232 may be connected through conduit 234 to the high pressure side on de-energisation of a solenoid 229 controlling the position of a valve 229'.

The valve 229' comprises a ball 237, a solenoid-actuated piston 236 and three ports. In the position shown with the solenoid 229 energised the ball 237 is maintained in a position to close the supply of pressure fluid to the valve from the conduit 235. If the solenoid 229 is de-energised the pressure fluid in the conduit 235 forces the ball 237 to its uppermost position as shown in the drawing and connects the conduit 234 to the pressure conduit 235, the uppermost port connected to the low pressure conduit 235' being cut off by the ball 237. Thus when the solenoid 229 is de-energised, during an emergency as will hereinafter be described, the piston in the main control valve 209 is subjected to pressure fluid in the conduit 234 which, with the pressure exerted by the biassing spring 240, forces the plunger 224 to the right-hand side as shown in the drawings, this movement being assisted after the initial displacement by the uncovering of the outer face of the piston 232.

Changeover from control of the servo motor 210 by the main control valve 209 to control by the emergency control valve 211, that is, from electrical control to mechanical control may result in a jolt to the aircraft if the mechanical linkage has changed its length or effective length due to differential thermal expansion, steady-state deflections of the structure, or any other cause. To smooth out this jolt the changeover valve 223 is arranged to move comparatively slowly during the second half of its movement from left to right, as shown in the drawing. Thus during the changeover the rate of movement of the servo motor under the action of the emergency control valve is slow enough not to embarrass the pilot of the aircraft. In order to ensure this result the chamber 230' is connected to the conduit 231 through a conduit 231' and a restriction 231". Thus the first half of the travel of the plunger 224 will be rapid until the port connected to conduit 231' is cut off due to the free passage of the fluid through the conduit 231'. Thereafter passage of the fluid is restricted due to the restriction 231" and the movement of the plunger will therefore be slow compared with its movement in the first half of its travel.

The primary control valve 209 is of the kind in which a main control valve is controlled by an internal pilot valve in well-known manner. Further details of its construction need not be given here since they are not essential for a proper understanding of the invention. The pilot valve is mechanically connected by a rod 242 to a member 243 adapted to be positioned by the transducer 208 through an amount proportional to the signal applied to the transducer. Movement of the member 243 on energisation of the transducer 208 moves the arm 242 and with it the pilot valve to the left or right as shown in the drawing. This results in a movement of the piston of the main valve to follow the pilot valve in well known manner and thus to control the supply of pressure fluid through the changeover valve to the servo motor 210.

The electrical transducer 208 is a double-acting relay, that is, a relay such as that known as a Lawes relay having a polarised stator whose poles are so arranged and shaped in relation to the poles of a displaceable armature that the armature is magnetically biassed towards a fixed zero or central position from which, however, it is displaced in magnitude and sense according to the magnitude and sense of the current applied to a control winding or windings.

The emergency control valve or controller 211 is of conventional kind comprising a piston 261 and a cylinder 262, movement of the piston to the right hand as shown in the drawing resulting in the supply of pressure fluid through the valve through the annulus 226 of changeover valve 223 to the left hand side of the piston of servo motor 210 whilst movement of the piston 261 to the left hand side, as shown in the drawing, results in pressure fluid being applied through the valve, through the annulus 225 of changeover valve 223 to the right hand side of the piston of servo motor 210. Movement of the piston 261 of the emergency control valve 211 is produced by the differential movement of the two members 278 and 280 of the differential device 204 controlled respectively by the linkage 282 from the control column 201 and the linkage 281 from the output member 218 of the servo motor 210.

The pressure fluid for operating the servo motor 210 is provided by a pump $P_1$ or alternatively by a pump $P_2$. The pump $P_2$ may be considered to be an emergency supply of power in case of failure of the supply from the pump $P_1$. A supply valve 270 of the plunger type selectively connects the two sources of pressure supply $P_1$ and $P_2$ into the system. The supply valve 270 comprises a plunger 271 which is urged to the right hand position as shown in Figure 4A by means of a biassing spring 272. Each of the pressure sources $P_1$, $P_2$ consists of a high pressure line 270' and a return low pressure line 271' connected to the supply valve 270. In the position shown in the drawing the pressure supply $P_1$ is connected in circuit by the supply valve 270 whilst the pressure supply $P_2$ is rendered ineffective. The pressure in the left hand side of the plunger and a biassing spring 272 urge the plunger to the right hand side (as shown) against the pressure from $P_2$ on the right hand side of the plunger. If the pressure supply $P_1$ fails, the pressure on the left hand side of the plunger 271 falls and the pressure from $P_2$ on the right hand side of the plunger will urge the plunger 271 to the left hand side of the valve as shown in the drawing against the spring pressure. The pressure supply $P_2$ will then be connected in circuit through the channel 275 and the port 277, the low pressure side being connected from the conduit 235' through the annulus 276 and the low pressure conduit 271'. The switch S serves to operate an indicator 249 on the pilot's panel P to indicate which pressure supply is in operation.

The mechanical differential device 204 comprises the input lever 278 mechanically connected to the control column 201 by the linkage 282, and pivoted on the aircraft structure about an axis 283, an output lever connected to the linkage 281 and also pivoted about the axis 283, and a floating lever 284 pivoted on the lever 278 about an axis 285 and on the lever 280 about a pin 286 protruding through a slot 287 in the lever 278, the upper end of the lever 284 being connected to position the piston 261 of the valve 211. In an alternative form (not shown) the differential device may be a lever connected at its upper end to the linkage 281, at its lower end to the linkage 282 and at its centre to the piston 261 of the valve 211.

The pilot's control panel P comprises two tumbler switches M and N, two push button switches X and Y, two trimming push buttons U and V and two indicators one 249, referred to previously, and another 250. The push-button switches X and Y can be used by the pilot to select whether the servo motor 210 is to be actuated by electrical signalling through the potentiometers 206 and 207 from the control column 201 or by mechanical signalling through the mechanical linkage and differential device 204. The indicator 250 indicates which form of signalling is effective. If the system is set at electrical signalling the pilot may change to mechanical signalling by depressing push-button switch X, this releases a relay D and breaks its self-holding relay contact $D_1$, thus de-energising the solenoid valve 229' resulting in the plunger 224 of the change-over valve 223 moving to a position (to the right as shown in the drawing) in which it renders the main control valve 209 ineffective thus rendering the emergency control valve 211 effective to control the supply of pressure fluid to the servo motor 210. As has been stated, the emergency control valve 211 is mechanically operated by the control column 201 through the differentiating device 204 and the linkages 281 and 282. When the system is connected to operate in this manner it functions to provide power actuation of the elevator 202 from the control column 201 by the mechanical linkage in a well-known manner.

If now the pilot wishes to operate on electrical signalling the push-button switch Y is depressed which results in the energisation of relay D which is effective to make the contacts $D_1$ and $D_2$ simultaneously. Making of contacts $D_1$ holds the relay energised even when the switch Y is released. Making of contacts $D_2$ results in energisation of the solenoid 229' to cause the ball 237 to be pushed to its lowermost position as shown in the drawing. The left hand side of the piston 232 of the changeover valve 223 is thus connected to the low pressure side of the pump $P_1$ and the right hand side of the plunger 224 is connected to the high pressure in the conduit 231, resulting in a movement of the plunger 224 to the left hand side as shown in the drawing. The emergency control valve 211 is by this action cut off from control of the servo motor 210 and control by the main control valve 209 is substituted. Under these conditions, as has been stated, the outputs of the potentiometer 206 controlled by the control column 201 and potentiometer 207 controlled by the output member 218 of the servo motor 210 are supplied differentially through the electrical differential 245, the amplifier 248, relay C, and lead 251, to the transducer 208 to produce a displacement of the elevator 202 by an amount proportional to the displacement of the control column 201. It will be seen from the drawings that the output from the pick-off device 206 is supplied to the differential 245 through a switch $B_2$. This is operated to cut out the signal from the potentiometer 206 when the long term control unit 213 provides a control signal during automatic control. As has been stated above, if it is desired to switch from electrical control to manual control the switch X is depressed with the result that the circuit containing the contacts $D_1$ and relay D is broken and all the contacts held closed by the relay D are opened. Thus contacts $D_1$ are opened and are not closed again until the switch Y is depressed and contacts $D_2$ are opened with the result that the solenoid 229 is de-energised and the ball 237 is moved to its uppermost position, with the result that the valve 223 is rendered effective to enable the valve 211 to control the supply of pressure fluid to the servo-motor 210.

When the system is operated under manual electrical signalling conditions the short term stabilising unit as has been stated, may also be used to provide auxiliary control of the elevator 2 to nullify short term oscillations of the aircraft in pitch. For this purpose the switch M is provided. When closed the switch M energises relay A, which results in the closing of contacts $A_1$ to connect the output of the short term unit 212 to the electrical differential 247, this output signal being combined with the signals from potentiometers 206 and 207 combined in the differential 245. In the present embodiment in order to ensure that the movement of the elevator 202 produced as a result of its actuation by the output from the short term unit 212 are not reflected on the control column 201 a lost motion device 252 is provided. As shown, the lost-motion device comprises lever 253 pivoted on a second lever 256 about an axis 254 and having its upper end connected to the linkage 282 and its lower end connected to the control column 201 through the link 255. The second lever 256 is pivoted on the aircraft structure about an axis 257. The extent of the lost motion provided depends on the angular movement permitted to the second lever 256 about the axis 257 by a stop member 258 forming part of a locking device for the lost motion device. In practice the lost motion provided is set to be the equivalent of the travel of the emergency control valve 211 plus the maximum expected output from the short term stabilising unit 212 plus the maximum error expected from the electrical signalling system, that is, the differential output from the potentiometers 206 and 207 plus an allowance for change in the length or effective length of the mechanical linkage due to differential thermal expansion of the structure or other reasons; thus the lost motion is never entirely taken up under normal conditions. Since the linkage between the power unit and the feel unit is moved by the servo motor 210 and not by the pilot the pilot is relieved of the frictional load imposed by the linkage when the system is operating under manual control with electrical signalling. The locking device for the lost motion device of which the member 258 is a part, comprises a plunger 259 which is urged by a biasing spring in the direction to cause the member 258 to engage in the slot 260 in the lever 256. The locking device is rendered ineffective by an electromagnet 261 which operates, when it is energised, to withdraw the plunger 259 from the slot 260 against the action of the biassing spring. The energising winding of the electromagnet 261 is connected in parallel with the solenoid 229 of the solenoid valve 229'. The locking device, will therefore, be dis-engaged at all times except when the servo motor 210 is controlled by the control column 201 through the emergency control valve 211, that is, when the solenoid 229 has become de-energised for one reason or another.

In order that the aircraft may be controlled automatically through the control system the switch N provided on the pilot's panel P is operated by the pilot to render the long term unit 213 effective. When the switch N is closed, a relay B is energised resulting in the closing of contacts $B_1$ and $B_2$. The closing of contacts $B_1$ results in the inclusion of the output of the short-term unit 212 in the electrical differential 247 and the closing of the contacts $B_2$ results in the inclusion of the output of the long-term unit 213 in the differential 245 whose output, as has been stated, is supplied to differential 247. When the contacts $B_2$ are closed the contacts $B_2'$ are opened thus rendering the output from the potentiometer 206 ineffective to influence the operation of the automatic control system. The outputs of the short-term unit 212, the long-term unit 213, and the potentiometer 207 at the servo motor 210 are thus applied together to the amplifier 248, whose output is applied through the relay C and lead 251 to control the transducer 208. As a result the elevator 202 is displaced until the input signal to the amplifier 248 is reduced substantially to zero.

Provisions are made for ensuring that should any emergency arise when the aircraft is under full automatic control or under powered manual control with electrical signalling, the control system may be changed either manually at will or automatically, on the occurrence of certain emergencies into one in which the elevator 202 is controlled by the control column 201 through the mechanical differential device 204 and the emergency control valve 211. The push button switch X enables the pilot to transfer from manual power control with electrical signalling to manual control with mechanical signalling. The same effect is obtained if any one of safety contacts H, $C_1$, $E_1$ or K is broken.

These safety contacts H, $C_1$, $E_1$, K are arranged to be broken on the occurrence of certain emergencies to be described.

The contacts H form part of a linkage overload switch 262 which, as shown, comprises two members 263 and 264, the former connected to the linkage 282 and the latter connected to the lever 253. The arrangement is such that movement of either the linkage 282 or the lever 253 produces movement of the other member against a pre-loaded spring 265 positioned between two spaced members 266, 267 positioned in an annulus in the member 263 and freely mounted for axial movement on an extension of the member 264. The contacts H are broken if relative movement between the two members 263 and 264 of more than a predetermined amount takes place, when the spring 265 is overloaded. The contacts H also provide means for the transferring from the electrical signalling mode of control to emergency control, that is, to controy by the emergency control valve 211 and the differential 204, since the pilot is enabled to break the contacts H by exerting sufficient force on the control column 201 if the aircraft fails to respond as he desires when the system is operating on powered manual control with electrical signalling or if he desires to transfer to emergency control for any other reason. The effect of breaking the contact H is the same as that of depressing the push button switch X, namely, the releasing of relay D with the consequent de-energisation of the solenoid 229 of the solenoid valve 229' which allows the changeover valve to move to transfer control from the main control valve 209 to the emergency control valve 211, through the differential device 204. For these purposes the switch 262 includes, as shown, an extension of the member 263 in the form of a bent finger 263' which extends between the two contact arms 264', 265' so that relative movement of the members 263, 264 away from each other by more than a predetermined amount causes the finger 263' to displace the contact 265' and relative displacement towards each other by more than a predetermined amount causes finger 263' to displace contact 264'.

Contacts $C_1$ are broken by a relay C connected between the output of the amplifier 248 and the input to the transducer 208 when the output from the amplifier 248 exceeds a predetermined value. Thus the relay C will break the contacts $C_1$ if the amplifier itself develops a fault producing excessive signals or if an excessive error signal is supplied to the amplifier, such error signal being either the difference between the outputs of the potentiometers 206 and 207 when the control system is operating on powered manual control with electrical signalling or the difference between the sum of the signals produced by the short-term unit 212 and the potentiometer 206 and the signal from the potentiometer 207 or the difference between the resultant signal ordered by the automatic control system and the output of the potentiometer 207 when the control is fully automatic.

Thus, it may be stated that the relay C operates to break the contacts $C_1$ when an error signal developed as the difference between a command signal and a repeat back signal in the servo system exceeds a predetermined value. The relay C is also rendered effective to break the contacts $C_1$ on the occurrence of a short circuit in the transducer 208 or sticking of the electrically operated main control valve 209, resulting in the input signal building up when no response is obtained by the system.

The relay E operates to break the contacts $E_1$ to transfer control to the emergency control valve to take care of faults which cause a more gradual runaway from a steady condition. The relay E has supplied to it before amplification the differential output of the two potentiometers 206 and 207 that is applied to the electrical differential 268. Therefore, if the system is operating on powered manual control with electrical signalling or on automatic control and an error signal between the input potentiometer 206 and the output potentiometer 207 gradually develops to exceed a predetermined amount, the relay E will function to break the contacts $E_1$ and thus transfer the system to emergency control through the emergency control valve 211 and the differential 204.

Means may be provided to ensure that the magnitude of the error which causes relay E to operate, varies with air speed in any required manner. To prevent the relay E from being operated by a very rapid movement of the control column 201, which might produce a large error, the feel unit may incorporate a damping device, not shown, which is preferably arranged to give the optimum damping for feel purposes up to a certain rate of movement of the control column and a sharply increasing damping for excessive rates. Relay E will then only operate when the pilot exerts excessive loads on the control column. The relays E and C will both operate if a fault occurs in the input or output potentiometers 206 and 207. The relay E would fail to operate if the fault was failure of supply to both the input and output potentiometers 206 and 207, if, at the same time, supply to relay D is still maintained. As a safeguard against this possibility, a further relay, not shown, is connected across the supply to the two potentiometers which operates to make a contact (not shown) in series with the contacts $C_1$, $E_1$ and K.

The contacts K are provided as a safeguard against the occurrence of short circuit and consequent burning out of the windings of the transducer 208 such as would cause full travel of the valve 209. It is also a safeguard against sticking of the pilot valve which may also cause full travel of the main valve. If the transducer is of the kind which has push-pull windings and one winding is burnt out, energisation of the winding moves the transducer member 243 in one direction or the other to break the contacts K. If the pilot valve sticks, the main control valve and with it the transducer member 243 will be deflected fully to one side or the other and the contacts K will be broken.

In a complete system for controlling an aircraft in which a system substantially of the kind described is used to control the aircraft about each of its axes, the safety contacts for the three axes are arranged in series; thus failure in a system operative about one axis causes reversion to emergency control for all three axes.

The powered manual control system described is one in which the control column 201 on being displaced effects actuation of the elevator 202 through the servo motor 210 to an angle corresponding to the displacement of the control column 201 and there is no provision inherent in the control arrangement for the servo motor for ensuring proportional feel, that is, the system is not one in which there is a reaction of the load forces acting on the elevator 202 back on the manual controller or control column 201. Instead of inherent proportional "feel" there is provided as has been stated, an "artificial feel" device 216' which is used to apply forces to the control column 201 similar to those that would be applied by the elevator 202 if this were operated directly from the control column 201. The device 216' comprises two members, one, 216a, in the form of a piston connected to the control column 1 by means of a mechanical linkage 253–256, and the other, 216b, in the form of a cylinder for the piston mounted in a support 257' and longitudinally adjustable in the support. The device 216' also comprises a centralizing device between two members which may be a centralizing spring, or an arrangement of springs, or an equivalent, and which exercises a centralizing force between the two members proportional to their displacement. The centralizing device therefore exercises a centralizing force on the control column 201 proportional to the displacement of the control column 201 from a zero position determined by the position of member 216b in its support. The centralizing device comprises two springs in the cylinder 216b on either side of the piston and connected at their outer ends to the ends of cylinder 216b and at their inner ends to piston 216a. The zero position to which the centralising spring device tends to centralise the control column 201 is made adjustable by a trim motor 216", the adjustment being made by energising the trim motor 216" which functions to move the anchorage of the centralising springs, that is, the cylinder 216b, slowly in one direction or the other. In the normal or zero position of the control system the anchorage of the centralising spring device is in the position where the latter exerts no centralising force on the control column 201 if the control column is in the position corresponding to the normal or zero position of the elevator 202. When the system is adjusted in this manner the pilot, when he operates the control column from its zero position, feels the centralising force exerted by the centralising device on the control column 201 and this centralising force then corresponds in magnitude and sense to the deflection imparted to the elevator 202 from this zero position; consequently the pilot experiences "artificial feel" corresponding to the torque that he would feel if he had adjusted the elevator 202 directly by the control column 201 and was thus experiencing the back thrust from the control surface.

If the aircraft is out of trim the elevator 202 will, in general, have to be held deflected by an appropriate amount to compensate for the out-of-trim condition, that is to say, it will have to be given an appropriate average or long-term deflection as in addition to whatever short-term deflections are required to produce the required or demanded short-term displacements of the elevator 202. The pilot will have to maintain this mean deflection of the elevator by maintaining a mean deflection of the control column 201 and he will therefore feel that the centralising spring device is exerting centralising forces on the control column 201 having as their mean value a steady component force in one direction. This provides him with the information that the aircraft is out of trim.

The object of providing the settable adjustment of the "artificial feel" device 216' is to enable the pilot to set the zero position of the device to correspond to the mean deflection of the elevator 202 required to compensate for the out of trim condition of the aircraft. To do this the pilot adjusts the "artificial feel" device 216' when he is controlling the aircraft under manual control by displacing the anchorage of the centralising spring until he experiences no component of centralising force exerted on the control column 201 by the centralising spring. The system is then said to be trimmed and the pilot, when he moves the manual controller feels only the fluctuating components of the centralising force exerted by the "artificial feel" device, corresponding to the displacement of the elevator about its trim position. The adjustment of the "artificial feel" device 216' to its trim position is effected by the trim motor 216" which may be energised by the pilot at will by the operation of one or other of the switches U and V on the pilot's panel P.

With the present control system as has been stated, there are alternative modes of operation capable of being set into operation as desired, namely, a manual control mode in which the elevator 202 is controlled to follow movement of the control column 201 and an automatic control mode in which the elevator 202 is automatically moved under the control of a controlling instrument or instruments in the control unit 205 to satisfy requirements that are monitored by the controlling instrument or instruments. The manual control arrangements are provided with the "artificial feel" device described above with provision for adjusting the zero position of the "artificial feel" device to compensate for out-of-trim conditions of the aircraft. The system may have been transferred to automatic control from a previous condition of manual control in which the elevator might have been adjusted to compensate for an out-of-trim condition of the aircraft. Provisions are made in such a case to ensure that, if the system is changed back suddenly from automatic control to manual control, the "artificial feel" device 216' is correctly trimmed to suit the position of the control column 201 at the beginning of the subsequent manual control mode of operation. An arrangement is thus provided for automatically adjusting the setting of the "artificial feel" device 216' during the automatic mode of operation. If the instrument or instruments in the control unit 205 are controlling the aircraft about its pitch axis to fly horizontally or at a certain angle of climb the "artificial feel" device 216" is automatically slowly adjusted during the automatic control of the aircraft so that when the changeover to manual control takes place, no centralising force is exerted on the control column 201, during subsequent control of the aircraft, if the control column 201, is held in the position required to make the aircraft continue in the mode of flight previously maintained whether this mode is level flight or a climb at a constant angle.

In order to achieve this result the output of the electrical differential 268 which is the difference between the signal generated by the potentiometer 206 and the signal generated by the potentiometer 207 is applied to the amplifier 269 and the amplifier output is applied along the leads 290 to control the trim motor 216" to rotate in one direction or the other depending on the sense of the signal derived from the amplifier 269. The control column 201 when left alone by the pilot during the automatic mode of operation of the control system is centralised by the spring centralising device of the "artificial feel" device 216' and therefore moves with the latter when the latter is moved by the trim motor 216. The differential device 204 permits differential movement to occur between the control column 201 and the elevator 202 during automatic mode of operation and accordingly when the elevator 202 is displaced during automatic control a difference signal will exist in the electrical differential 268 which will cause the trim motor 216" to run in the direction to reduce the force that the centralising device exerts on the control column 201. As a result, the member 216b is caused to assume a position that corresponds to the mean position of the control surface.

The centralising force exerted by the centralising spring on the control column 201 must be sufficient to overcome any frictional force opposing displacement of the control column.

The output of the electrical differential 268 is rendered effective through the amplifier 269 to energise the trim motor 216" by the closing of contacts B₄ when the relay B is energised on depressing switch N on the pilot's panel P to introduce automatic control of the aircraft. At the same time switch B₂' is actuated to disconnect the potentiometer 206 from the automatic control circuits.

During the automatic control mode of operation of the system short-term correction movements are continually applied to the elevator 202 to correct disturbances of the aircraft. These movements of the elevator are superimposed on the mean value of the deflection of the elevator required to compensate for any out-of-trim condition of the aircraft. The short-term oscillating displacements of the elevator do not appreciably affect the operation of the automatic control arrangements for the trim adjustment. They produce short-term oscillations in the misalignment between the control column 201 and the elevator 202 and consequent short-term oscillations in the error signal developed in the electrical differential 268 are applied to the trim motor 216". However, as the trim motor 216" responds only slowly to the error signal these short-term oscillations average out to zero over period long compared with the period of the short-term oscillatory disturbance of the aircraft and the trim motor will drive the "artificial feel" device to seek a position corresponding to the mean position of the elevator 202, with only a very small oscillating disturbance superimposed.

As a result of the operation of the automatic trim system the control system as a whole is always kept substantially trimmed so that if a changeover from the automatic mode of operation to the manual mode of operation takes place the "artificial feel" device is correctly trimmed at the beginning of the manual control period so that, even if the pilot does not immediately take control of the control column, the centralising device tends to move the control column 201 towards the mean of the positions through or in which it was previously being moved or held during the automatic control mode of operation. The elevator 202 will therefore be given a deflection corresponding to the mean of the deflections that were previously being imparted to it under automatic control.

The magnitude of the centralising force applied by the "artificial feel" device to the control column 201 corresponding to any particular deflection of the control column, that is to say, the force displacement ratio of the "artificial feel" device is also made variable so that it may be increased or decreased when the aero dynamic force applied to the elevator 202 for a given deflection of the elevator, that is to say, the force displacement ratio of the elevator is increased or decreased, for example, when the air speed of the aircraft is increased or decreased. In other words, the effective stiffness of the centralising spring device is made adjustable so that it can be increased or decreased as the effective stiffness of the aero dynamic returning force acting on the elevator increases or decreases. The adjustment of the effective stiffness of the centralising spring is effected automatically in dependence on the variable factor by a feel adjustment motor 293. The motor 293 may be controlled to adjust the lever arm with which the spring exerts its centralising force on the control column 201 by angularly adjusting the position of the support 257' about the pivot point 257". The motor is controlled in dependence on a measure of air speed and the spring stiffness may be caused to vary in the same manner with air speed as does the aero dynamic stiffness which means that it should be varied according to the quantity $Pv^2$ where $P$ denotes the air density and $v$ the air speed. An output signal dependent on this quantity is provided by an air speed indicator 291 which provides its output along the load 292 to the feel adjustment motor 293.

It will be appreciated, of course, that manually-operated means may be provided for enabling the effective stiffness of the centralising spring device to be set in accordance with a desired variable factor, such as the air speed of the aircraft, variation of which varies the aero dynamic force that acts on the elevator when it is deflected.

Alternatively the centralising spring device may be a spring radially directed from the pivot axis of the control column 201. This provides a centralising force on the control column when the latter is deflected from the central position proportional at least for small deflections to the tension in the spring and to the angular deflection of the control column. A simple way of adjusting the effective stiffness of the spring is then to use the feel adjustment motor to extend or diminish the extension of the spring and in this way to increase or diminish the tension.

If desired the lost motion device 252 may be omitted from the control system and a modification of that part of the system of FIGURE 4 in which the lost motion linkage has been omitted is illustrated in FIGURE 5. In this case the frictional load of the linkage system has to be overcome by the pilot.

It will be appreciated that modification of the apparatus described above may be made without departing from the scope of the invention. For example, the potentiometers 206 and 207 may be replaced by A.C. inductance signal generators such as selsyn signal generators or the error signal would be produced as a single A.C. signal from a pair of inter-connected selsyns.

What is claimed is:

1. A manual booster servo system for moving the control surface of an aircraft comprising a manual controller, a hydraulic servomotor operatively connected to the control surface, means for providing an electrical output dependent upon the relative displacement of said controller from a null condition and surface from a null condition, a first valve for operating said servomotor responsive to said electrical output means, a differential linkage connected to the controller and to the surface providing a mechanical output, a second valve for operating said servomotor responsive to said linkage output, means for connecting said valves in the system alternatively including a two-position third valve that in one position connects the controller and servomotor through the electrical output means and in the other position connects the controller and servomotor through the differential linkage, and means for moving said third hydraulic valve from one to the other of its operating positions.

2. A booster system as claimed in claim 1 in which said third valve moving means includes means for normally biasing the third valve in the position connecting the first valve and servomotor, normally ineffective means for urging the third valve to its other position against the action of said biasing means, and means for rendering said urging means effective to transfer the operation of the system from the first valve to the second valve.

3. A booster system as claimed in claim 1 including means for producing a damping output in accordance with the turn rate of the craft about the axis related to the surface, and means for connecting said turn rate output means in the system to provide a second output to operate said first valve.

4. A booster system as claimed in claim 3, in which said third valve moving means includes normally ineffective means for transferring the system to operation by the second valve, and means for rendering said transferring means effective when the output of said differential linkage exceeds a predetermined valve.

5. A manual booster servo system for moving the control surface of an aircraft comprising a manual controller, a servomotor operatively connected to the control surface, means for providing an output dependent upon the relative displacement of said controller from a null condition and surface from a null condition, a first valve responsive to said output means for operating said servomotor, a differential linkage connected to the controller and to the surface providing a mechanical output, a second valve responsive to said mechanical output for operating said servomotor, means for connecting said first valve and said second valve in the system alternatively including a third valve for conditioning the system for operation by the controller through the first valve and means for conditioning the system for operation by the controller through the second valve, and means for operating said third valve to change the system from one condition of operation to the other condition of operation.

6. In a manual booster servo system for aircraft with a control surface, a hydraulic servomotor operatively connected to the surface to move the craft about an axis, a manual controller, means for providing an electrical output dependent upon the relative displacement of said controller from a null condition and the displacement of the control surface from a null condition, means for providing a damping output for the system in accordance with the turn rate of the craft about the axis, means for operating said servomotor responsive to the output of said electrical output means and responsive to the output of said damping output means to reduce short-term oscillations of the craft of low amplitude about the axis, and a mechanical connection including a differential linkage between the controller and surface that provides for limited displacement of the surface under the influence of the damping output means without corresponding displacement of the manual controller.

References Cited in the file of this patent

UNITED STATES PATENTS

| 2,678,177 | Chenery et al. | May 11, 1954 |
| 2,739,771 | Meredith | Mar. 27, 1956 |
| 2,773,660 | Rasmussen | Dec. 11, 1956 |
| 2,853,255 | Rasmussen et al. | Sept. 23, 1958 |